United States Patent
Kisters

(10) Patent No.: US 10,255,497 B2
(45) Date of Patent: Apr. 9, 2019

(54) AUTHENTICATION METHOD AND AUTHENTICATION SYSTEM

(71) Applicant: Friedrich Kisters, Kreuzlingen (CH)

(72) Inventor: Friedrich Kisters, Kreuzlingen (CH)

( * ) Notice: Subject to any disclaimer, the term of this patent is extended or adjusted under 35 U.S.C. 154(b) by 0 days.

(21) Appl. No.: 15/129,781

(22) PCT Filed: Mar. 18, 2015

(86) PCT No.: PCT/EP2015/055624
§ 371 (c)(1),
(2) Date: Sep. 27, 2016

(87) PCT Pub. No.: WO2015/144509
PCT Pub. Date: Oct. 1, 2015

(65) Prior Publication Data
US 2017/0154218 A1   Jun. 1, 2017

(30) Foreign Application Priority Data
Mar. 27, 2014   (DE) .................. 10 2014 004 347

(51) Int. Cl.
*G06K 9/00* (2006.01)
*G07C 9/00* (2006.01)
(Continued)

(52) U.S. Cl.
CPC ......... *G06K 9/00577* (2013.01); *B42D 25/00* (2014.10); *B42D 25/305* (2014.10);
(Continued)

(58) Field of Classification Search
None
See application file for complete search history.

(56) References Cited

U.S. PATENT DOCUMENTS 6,331,569 B1 * 12/2001 Kisters .................. A61K 8/447
514/561
6,701,615 B2 * 3/2004 Harding ................. B23P 6/002
29/402.07
(Continued)

FOREIGN PATENT DOCUMENTS

DE         103 04 805 A1    8/2004
DE   10 2009 033221 A1    1/2011
(Continued)

OTHER PUBLICATIONS

International Search Report of International Application No. PCT/EP2015/055624 dated Jun. 12, 2015.

*Primary Examiner* — Andrae S Allison
(74) *Attorney, Agent, or Firm* — Roberts Mlotkowski Safran Cole & Calderon, P.C.

(57) ABSTRACT

The invention relates to a method and to a device for authenticating and/or identifying persons, objects, or service systems. In said method, a material, a construction, a substance, or a composition, or an image thereof, either changes itself or is actively changed, by means of a physical, chemical, or mechanical influence or feature, such that the resulting structure or feature is unforeseeable. If an image of said material, of the construction, of the substance, or the composition recorded at a later time is compared with the image stored in a storage means, the person and/or the object and/or the medium and/or service system is positively authenticated if the material, the construction, the substance, or the composition has at least partially changed between the two times in comparison with the image stored in the storage means.

16 Claims, 10 Drawing Sheets

(51) Int. Cl.
*B42D 25/00* (2014.01)
*B42D 25/305* (2014.01)
*B42D 25/369* (2014.01)

(52) U.S. Cl.
CPC ....... *B42D 25/369* (2014.10); *G07C 9/00015* (2013.01); *G06K 2009/0059* (2013.01); *G07C 9/00007* (2013.01)

(56) References Cited

U.S. PATENT DOCUMENTS

| | | | | |
|---|---|---|---|---|
| 2003/0167616 | A1* | 9/2003 | Harding | B23P 6/002 29/407.05 |
| 2004/0107367 | A1* | 6/2004 | Kisters | G06F 21/32 726/9 |
| 2011/0060920 | A1* | 3/2011 | Kisters | H04L 63/06 713/189 |
| 2011/0107405 | A1* | 5/2011 | Kisters | G06F 21/32 726/5 |
| 2011/0247058 | A1* | 10/2011 | Kisters | G06F 21/31 726/5 |
| 2012/0175866 | A1* | 7/2012 | Kisters | G07C 11/00 283/67 |

FOREIGN PATENT DOCUMENTS

| | | |
|---|---|---|
| DE | 10 2009 039190 A1 | 3/2011 |
| DE | 10 2010 009 977 A1 | 9/2011 |
| DE | 10 2011 055 297 B4 | 5/2013 |
| EP | 1158459 A1 | 11/2001 |
| WO | 2011/006640 A1 | 1/2011 |
| WO | 2013/191913 A1 | 12/2013 |

\* cited by examiner

A

B

C

D

A

B

C

A

B

C

A

B

C

A

B

C

A

B

C

AUTHENTICATION METHOD AND AUTHENTICATION SYSTEM

The present invention relates to a method and an authentication device for authentication and/or identification of persons, objects, service systems or computer programs, in which a static, non-changing security feature for the person, the object, the service system or the computer program is either newly generated, or an existing one is used, which is followed by the addition of not predetermined factors changed and is thereby converted into a dynamic security feature.

STATE OF THE ART

Many of the known authentication devices are based on rigid security features in which, for example, a PIN number, a biometric feature (e.g., fingerprint), a code or a password is assigned to a specific user. In service systems, access restrictions to specific user groups are the rule and require extensive security measures to secure related sensitive data of the participants.

Usually, authentication methods are based on a previous registration, in which before the first access to the application the identity of a user is stored by entering of user data. In the prior art, it is differentiated between different authentication methods, whereby the factors include the knowledge (e.g. password), the ownership (e.g. an access card) and personal features of the user (e.g., fingerprint, signature).

Further developments of these technologies for example envisage that small portable devices generate valid passwords via an algorithm and an authentication server at the same time and show them on a display. These passwords contain mostly longer series of numbers that must be entered correctly. Many of these methods however can be easily tampered with or bypassed. Password-based authentication methods are extremely vulnerable because data transmissions can be intercepted and hacked.

Methods involving a biometric detection of features of the user, such as a fingerprint or an iris scan of the user are not always reliable and are also moreover not secure against potential attackers, because the biometric data do not change and therefore can be copied.

An example for the transfer of security features in a network system is described in DE 10 2011 055 297 B4. Thereby, the security features are stored seperately from the application server in an autonomous authentication device. A disadvantage of the method, however, is that these are inflexible security features which can be copied.

Another way is pursued in WO 2013/191913 A1. Here, a three-dimensional code having a structure or a profile in the X-, Y- and Z-direction is described. Information is encoded in the structure. Here, different parameters of the structures, such as the height, width, or the depth and the shape of the elements are used to encode information. The codes contained therein may also contain more information, for example, conventional codes such as bar codes or QR codes. In such codes, the structure, even if two-dimensional, is predefined and does not change. A change in the structure would inevitably result in a deletion or alteration of the information encoded and would be undesirable. Thus, these 3-D structures can be very easily circumvented by an attacker.

In DE 10 2010 009 977 A1, a security element having aligned magnetic pigments is described, wherein a dynamic subject is generated by the action of laser radiation. The combination of a static and a dynamic subject should significantly increase the attention and recognition value of the security element.

In addition, security elements and methods are known, in which surface structures or material structures that are part of a security element, an object or a person, are harnessed. In WO 2011/006640, for example, topographic structures in the form of craquelure are used as a security feature.

In EP 1 158 459 A1, a method for authentication of objects is described, in which a material is provided for generating a security feature and is assigned to an object. The image of the substance is captured first time and stored in a storage device. For authentication, the image of the material is compared with the stored image in the memory device. Then the image of the substance is actively changed, for example by irradiation with IR or UV light, so that the resulting structural feature (a time-varying luminescence) is unpredictable. At a further point in time, the image of the substance is captured again and the obtained current image is compared with the stored one in the memory device. The object is then authenticated positive, if the substance has at least partly changed against the image stored in the memory device between the two times. Thus, waveforms of the measured time-dependent luminescence are compared as an authenticating feature in the method, wherein a point-to-point comparison of the light decay curve with the stored reference curve in the memory device is carried out.

DESCRIPTION OF THE INVENTION

In this context, it is an object of the present invention to provide an improved method for the authentication and/or identification, with which, for example, persons, objects, service systems or computer programs can be authenticated and/or identified.

According to the invention, a material, a structure, a substance or a composition is first provided which serves as a security feature. Preferably, the material, the structure, the substance or the composition has features that are unique. Preferably, specific materials or properties of a material of a particular product class are assigned for authentication. The material, the structure, the substance or the compositions or parts thereof thus provided are assigned to a specific person, an object, a medium, a service system. The medium can be, for example, a software (computer program) or a data storage device. In one variant, an image of this material, the structure, the substance or the composition can also be assigned to a person or a medium, wherein the image is preferably provided in digital form. Preferably, the image of the material, the structure, the substance or the composition is first captured and stored at a first time point in a storage device. In a preferred variant, it is stored digitally, preferably in connection with a unique number or series of numbers, which designate or identify the material, the structure, the substance or the composition, or divisions thereof. According to the invention, it is now provided that a so created security feature in the further development either changes itself or is actively changed by a dynamic factor. The change may take place, for example, by activation, transformation, in particular, by a physical or chemical interaction. Preferably, the feature is changed by a physical, chemical or mechanical impact or by a specific feature of a material or substance (or the composition), so that the resulting structure or feature can evolve in non-predetermined unpredictable way.

Preferably, the changes of the material, the structure, the substance or the composition or the respective image are therefore not predictable for a forger. According to the invention, it is further provided that a second time point, a further image of this material, the structure, the substance or the composition is captured and compared with the image stored in the memory device. The person and/or the object and/or the service system and/or the computer software are/is then authenticated positive, if the material, the structure or the composition vis-à-vis the image stored in the memory device has at least partly changed between the two time points. Should the authentication interval be too small to dynamically change the security feature, it is preferably provided that the change directly affects the stored digitized image. Furthermore, a subsequent authentication takes place by means of classical (rigid) authentication procedures. An example for this would be the making of two immediately consecutive transactions for a money transfer. Here, the method of the invention would be used for the basic authentication, in which the person or a communication device vis-à-vis the system initially authenticates itself and the individual transfers are then performed again on an alternative authorization.

Preferably, only a portion of the material, the substance or the composition has changed, while another part remains static, i.e. is present in an unchanged state. After successful authentication, the image of the security feature stored in the memory device is replaced by a second or further image at another query time. Preferably, this involves a security feature transmitted and altered from a local device, which is, for example, transmitted from a mobile phone of a user in digital form to an authentication device.

Various physical, chemical parameters or combinations of such parameters can be used for describing the feature of a substance, a material or a composition. For example, the colour of a substance, the amount or intensity of a physical parameter or the formation of three-dimensional structures in a corporeal structure can be used as security feature.

It is preferably provided that an update of the security feature stored in a database takes place at every update time or at each security query. The dynamic change of the security feature can take place either continuously or only when actually an authentication query or a query of the security features takes place. In an authentication query, a dynamic factor can also be selected, which changes the properties or structure of the security feature or its image for the transfer of further security features. The dynamic factor may relate to a physical variable, such as the GPS position, the state of charge of a battery or an accumulator, a unit of time, a vibration profile or some other measurable variables. Preferably, the dynamic factor itself is dynamically variable, i.e. its measurable quantity changes, for example, with respect to time. In this regard, different embodiments are conceivable.

In a preferred embodiment, the material is a stretchable material, such as a pleat band, which has a wave-like structure. The pleat band is stretchable or opened in the longitudinal direction, whereby its length and structure changes. Preferably, this can be a material which has a shape memory, i.e. a once established state is maintained until the next action (e.g. drawing or stretching). At a first query time, first an image of the pleat band is stored in a storage device and assigned to a specific person, an object, a medium, a service system or a computer software. Here, the three-dimensional structure or profile of the pleat band with its wave pattern can be defined by physical parameters (for example, by defining the levels in X, Y or Z direction). The said pleat band is pulled apart by a mechanical action (e.g. drawing), thereby changing its structure. At another query time, this altered structure is captured as new image and sent to the appropriate authentication device. The image of the security feature so transmitted is compared with the image stored in the database. It is noticeable that the basic structure or certain elements of it in certain features is/are identical or similar. Thereby, it can be evaluated that it basically corresponds to the original pleat band. However, certain physical parameters (e.g. the aforementioned levels in X, Y and Z directions) will have changed. This current state of the pleat band (or in general the security feature) as a new security feature is stored in the database after successful authentication. A potential forger therefore does not know which current image is currently valid. Due to the dynamic nature of the security feature, the profile or the structure of the pleat band can be further changed by a further mechanical action. At another query time, a renewed query and transmission of the security feature takes place with subsequent storing in case of positive authentication.

A further embodiment relates to a security element, in which a plurality of surfaces exhibit different textures. It is provided that a surface changes dynamically by an external factor, preferably by mechanical action. Preferably, the security element is hinged, wherein one half of the unfolded security element has a "dynamic surface", while the other half of the security element has structures which influence the dynamic surface. In one variant, it is provided that the "rigid surface" consists of elevations, tips or sharp edges, which are incorporated in the dynamic surface of the other half of the security element, when the security element is closed. In this way, structures on the surface are created that are unique and which change again with every opening and closing. At the individual query times, an image, such as a scan, can be made from the dynamic surface, which in turn is stored in data form in a database. In addition, it is also possible that the surface, which consists of elevations, peaks or sharp edges, changes dynamically, for example by flattening edges or peaks. This also results in a dynamic profile, which can be captured by a scanner and stored as image in a database. In addition, it is also possible that a surface dynamically changes completely, but that only one part of this surface is used for authentication. In this case, the image would represent only a part of the security element. The same also applies to the other embodiments described herein.

In a further embodiment, the surface of a security element is coated with a protective coating, which constitutes the static part and covers the structures of the surface. Another surface is coated with a dynamic coating that changes the structures of the surface. For example, the structure can be furrows or grooves which were introduced in the material with a laser. The coating can be for example an acidic coating, which is degraded after a certain time, so that the underlying structure does not change.

In a variant, the structure of the dynamic part of the security element can also be formed from a material, which physically or chemically changes, thereby changing the structures or the profile of the surface.

In a further embodiment, the security element consists of a rigid, non-flexible support surface and a flexible support surface. The flexible support surface changes preferably by dynamic shocks. Dynamic shocks can be triggered for example by carrying the security element in a trouser pocket. The rigid support surface is protected again such a dynamic change, i.e. the information contained therein or structures remain unchanged. Preferably, the rigid or flexible supporting surface forms the basis of an overlying layer, which either remains changed or unchanged. In another variant, the dynamic security information can also more quickly change as the "rigid" security information.

In another embodiment, a liquid or viscous material is provided, in which inclusions or cavities are present, which have a fixed position and shape within the material. In one variant, it may be envisaged that new inclusions or cavities form or reduce or close existing ones, so that also here the structure dynamically changes.

In another embodiment, magnetic particles are arranged in the material, which are movable. The magnetic particles form a characteristic structure in the material, which in turn can be assigned to a specific person, an object, a service system or a computer program. The particles can be, for instance, magnetic particles, which can be moved with a magnet within the material. The movement induced by the magnetic force can be controlled by external influences, for example, the amount of magnetic force, which in turn impacts the speed and the distance travelled by the magnetic particles in the material. In a preferred embodiment, cavities (e.g. air pockets) and particles having a different geometry, direction of rotation and/or form are present in the material. Also here, at different query times, snapshots of the respective structure or image are made and stored in a central or local databank. The structure will continue to change in an unpredictable way, i.e. the individual particles will move within the material. At another query time, this image is compared with the image stored in the database and updated upon positive authentication.

In a further embodiment, the security element is a material which can grow, for example by supply of energy. A crystal can be used as the material which changes dynamically and grows over a period of time. For the characterization of the material, not only the outer image can be used, but also the physical parameters, such as the colour, the colour intensity or the light refraction.

The embodiments mentioned are only examples of security elements, with which the inventive method can be executed. In a preferred embodiment, cavities (e.g. air pockets) and particles having a different geometry, direction of rotation and/or shape are present in the material.

The present invention further relates to an authentication system, with which persons, objects, service systems or software can be identified. The authentication system includes a local or central storage device for storing an image of a security feature in the form of a material, a structure, a substance or a composition. The stored security feature is assigned to a person, an object, a medium, a service system or a software. Further, the authentication system includes a query device to retrieve a current image of the security feature as well as a data matching device for comparing the retrieved image with the image of the material, the structure, the substance or the composition stored in the memory device. The authentication system is characterized in that the material, the structure, the substance or the composition comprise changing, unpredictable features or structures, which change either continuously or at request.

Further, a dynamic factor is provided, which effects a dynamic change in the property or the structure of the material, the structure, the substance or the composition. Preferably, the dynamic factor relates to a material property, the property of a device, a physical or a chemical parameter. It may, for example, involve a position indication (determined by GPS), a material feature (e.g. colour or colour intensity), and an electromagnetic feature (for example absorption/emission at a certain wavelength or magnitude of amplitude). In a preferred variant, it is provided that the dynamic factor itself changes dynamically between two time points. For example, the dynamic factor can involve the charge indicator of a cell phone battery. Thus, it may be provided that, depending on the state of charge of the cell phone, specific changes are effected, for example, to the data file of the stored image or through appropriate means directly to the structure of a material or a structure. This variation can take place either continuously or only after an authentication request has been made. The dynamic factor can thus have influence on either the material structure or on the image digitized and stored in the storage device.

BRIEF DESCRIPTION OF DRAWINGS

In the following drawings, some embodiments are shown in which the security elements are shown, which can be used in the inventive method. The inventive method principally uses dynamic structures or properties of a material, a structure, a substance or a composition and uses the dynamic changes to produce a modified dynamic security feature, which in turn can be stored in an updated form in a database.

WAYS OF CARRYING OUT THE INVENTION AND INDUSTRIAL APPLICABILITY

In FIG. 1A, the closed state is shown. This condition can be stored at a first query time as image for a security feature. In FIG. 1B, a slightly opened state is shown, in which the structures and profiles of the individual recesses and grooves are clearly recognizable. If the material (for example a polymer band) is opened further, also the physical parameters (for example diameter and angle) change of the individual furrows and recesses. However, it is also apparent that the fundamental character of the individual grooves and recesses, i.e. the exterior image, remains related. In this regard, one may compare particularly FIG. 1C and FIG. 1D. In the more open state of the material shown in FIG. 1C, more grooves and recesses are added. Now, if the database is updated with the changed dynamic states, then the security feature of the previously stored security feature must have emerged. The material must have either further opened or closed again. In FIG. 1D, in turn, the closed state is shown, in which, however, additional cracks have been added. On the far right side of the security feature shown in FIG. 1A-D, an optional static field is present, which marks the security feature, but without changing itself.

In FIG. 5A, the initial state is shown. Protective coating and activation coating cover the underlying surface with the therein-formed structures and profiles. In FIG. 5C, the activation coating leads to a change of the underlying profile, while the surface which is coated with the protective coating remains unchanged. In FIG. 5C, a dynamic further development is shown, in which the already formed structures in the dynamic security feature (FIG. 5B) have evolved.

In a further variant which is not shown here, it may be provided that the further development of the structured surface takes place only when the protective coating is stripped or removed. In such a variant, the structure would remain intact, as long as the protective coating covers the structured surface. The dynamic development of the profile and structures in the surface takes place only when the protective coating is partially or completely removed. This process can also be stopped by re-applying a protective coating.

Figure 1:
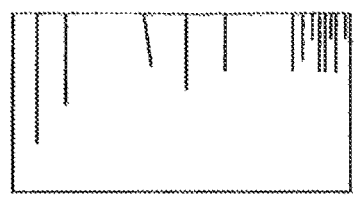
In FIG. 1, an example of a material is shown, which can be utilized in the inventive method. The material contains cracks or recesses, which become greater, the more stretched or pulled apart the material becomes.
Figure 1:
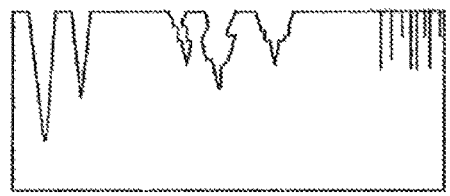
Figure 1:
Figure 1:
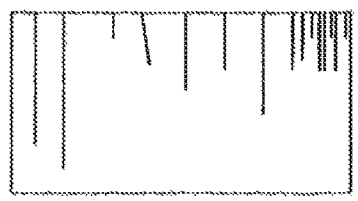
Figure 2:
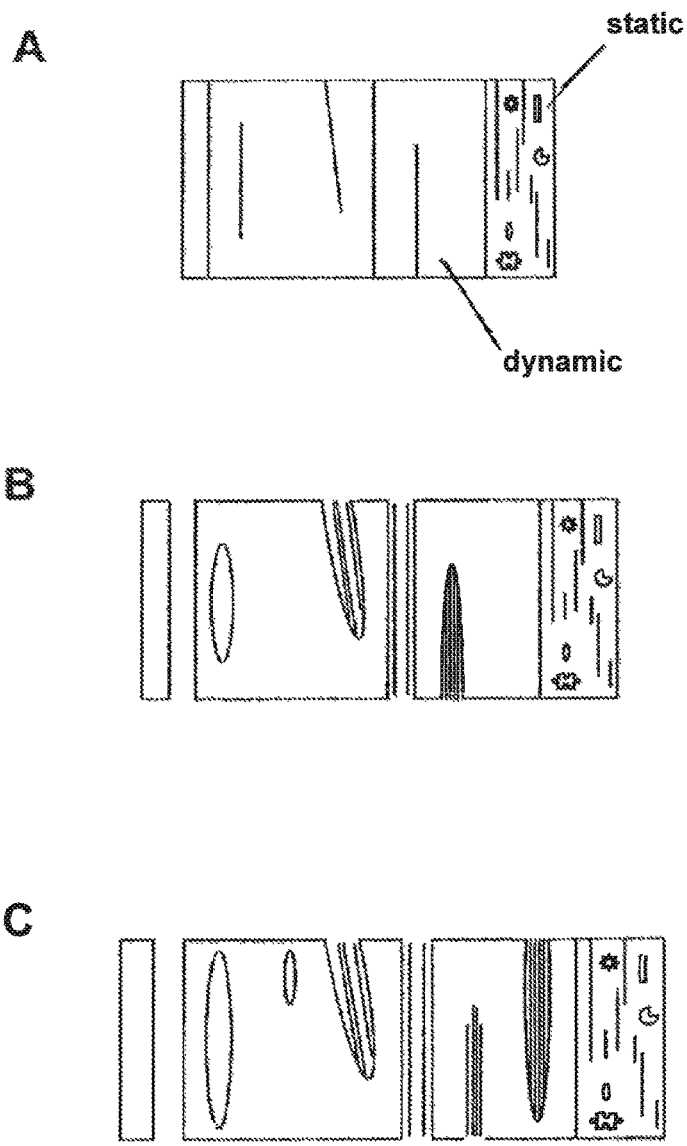
FIG. 2 shows the top view of the security element, which is shown in FIG. 1. In the right half of the figure, an example is shown, in which rigid geometric elements are incorporated in the material (see FIG. 2A, right side). If the material is stretched, i.e. is opened, then individual structures, cracks or recesses are visible in the material (FIG. 2B). In yet a further opening these structures change and other structures are added (FIG. 2C). The examples in FIGS. 1 and 2 show that depending on the representation (cross-section or plan view) a security element can also be used for various dynamic changes. Thus, the cross-section of the security element shows a different pattern than, for example, the same security element in a plan view. These variations can be utilized. Furthermore, the security element can be designed in the form of cubes or other geometric shape and are made readable from different sides, whereby the selection of sides and the corresponding areas are static or dynamic. For example, individual faces of a geometric structure have different profiles or colour schemes that change unpredictably and are read.
Figure 3:
In FIG. 3, a further embodiment is shown for the method. This relates to a security element, in which two different surfaces are formed. The surface on the left side at first characterizes the initial state, i.e., the surface is untreated. The right-hand surface of the security element has a structured surface with peaks and edges. To generate a dynamic security feature, the security element will be merged with the two halves. The spikes and edges work through the mechanical merging of the two halves in the material of the untreated surface, thereby material imprinting, friction points and pressure points occur (FIG. 3B). If the security element with the two halves unfolds again, it can be seen on the left half how the edges and spikes of the structured surface have been incorporated. In this way, from an initial rigid surface, a textured surface emerges, which can change dynamically in the further development, namely by further mechanical impacts. This may for example be carried out by the two surfaces moving relative to each other or by using another surface with edges or spikes, which change the dynamic surface in case of a mechanical closure. In addition, it is also possible that the dynamic half changes for example by flattening the edges or spikes of the structured surface, whereby the structure changes. Thus, both the left and the right half of the surface, as long as a dynamic change is present, can be used as a security feature.
Figure 3:
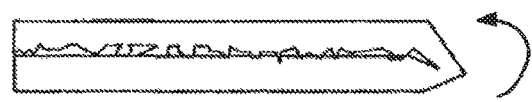
Figure 3:
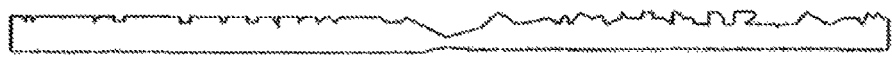
Figure 4:
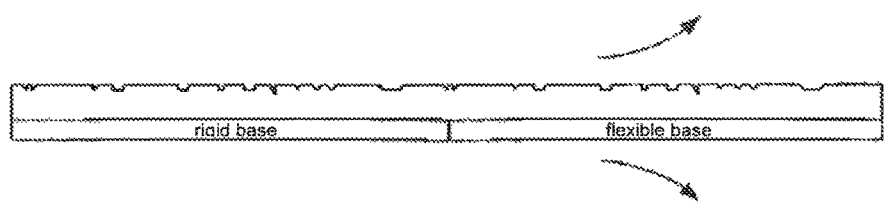
In FIG. 4, a security feature with a rigid and flexible substrate is shown. While the rigid substrate does not change the overlying surface, the flexible substrate leads to a change in the structure of the surface above of it. The flexible design of the right, dynamic part of the security element will thus result in a continuous change of the structures formed on the surface, whereby a dynamic security feature is created. By the impact of the flexible substrate on the overlying surface, the structure formed therein is changed continuously or already formed structures will be reinforced, which can be seen, for example, when comparing the profiles of FIGS. 4A, 4B and 4C.
Figure 4:
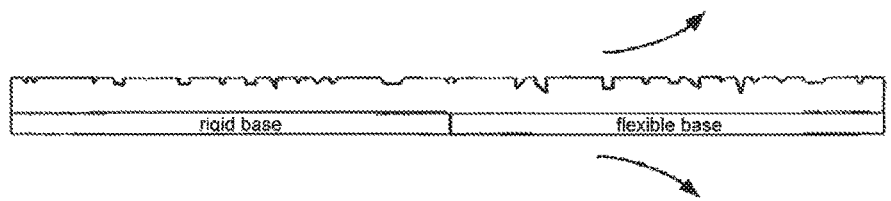
Figure 4:
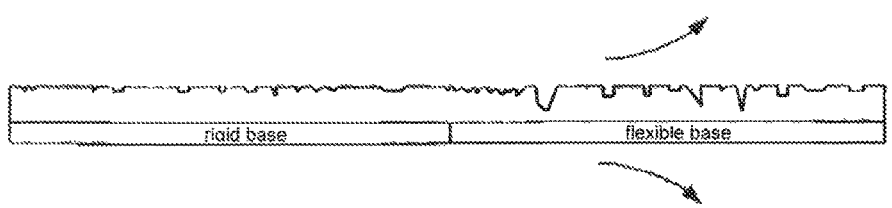
Figure 5:
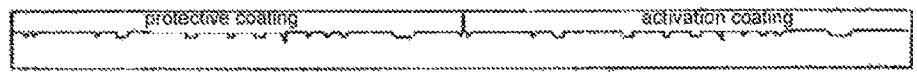
In FIG. 5, a further embodiment for performing the method according to the invention is shown. Again, a structured surface serves as a security feature. The surface of the rigid security feature is covered by a protective coating, which causes that the underlying structure does not change. The surface of the dynamic security feature is covered by an activation coating which changes the underlying structure, for example by physical or chemical interactions.
Figure 5:
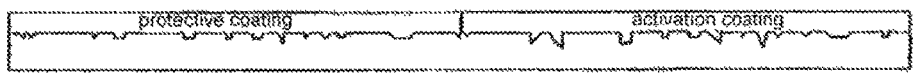
Figure 5:
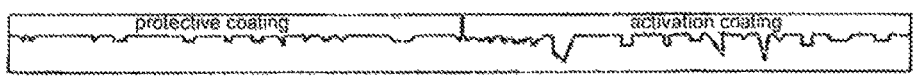
Figure 6:
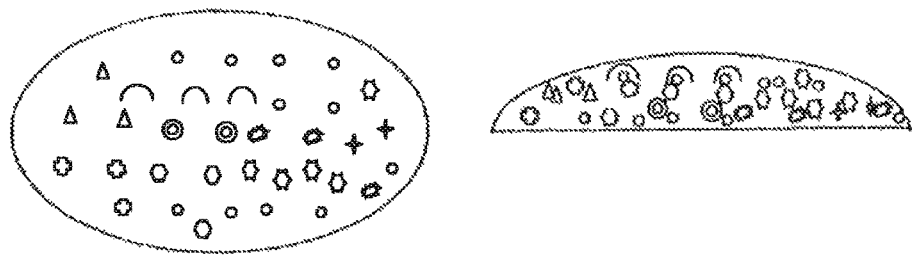
Figure 6:
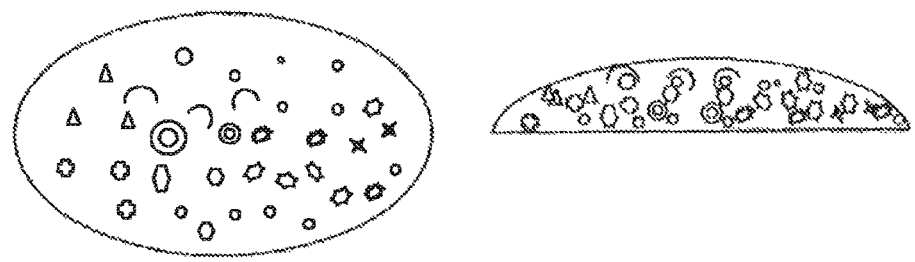
Figure 6:
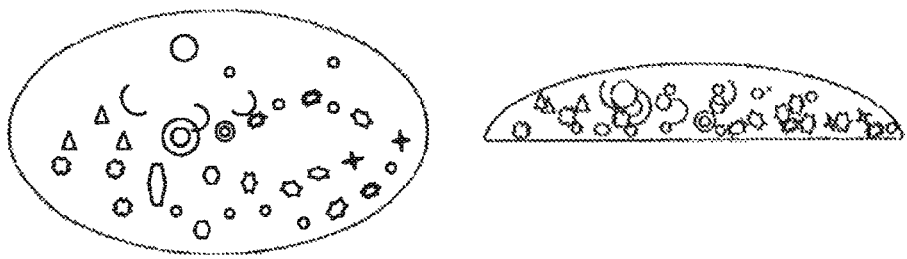

In FIG. 6, a further variant is shown, in which particles with the individual features are present in a material or substrate. The material in FIG. 6 includes voids and/or particles. The voids can be formed for example by air pockets or gas. The particles are preferably magnetic particles. The individual properties of the voids or particles determine the pattern of the security element. The voids and/or particles can change the shape and position. Furthermore, a turning of the particles is conceivable. In FIG. 6A, the initial state is shown. On the left side one can see the plan view, and on the right side the cross-section. Different geometries of particles and voids are arranged in the material. In FIG. 6B, a dynamic state is shown, in which the individual voids and particles change, in particular their shape, direction of rotation and position. Such changes may be effected for example by interaction between the inclusions and voids among themselves, by natural gravitation, by a movement of the security element or by other internal and/or external influences. In FIG. 6C, this state is further developed; it can be seen in cross-section to the right that the particles are pulled down. In the case of magnetic particles, this may be influenced, for example, by means of a magnet, which is mounted on the underside of the security element.

Figure 7:
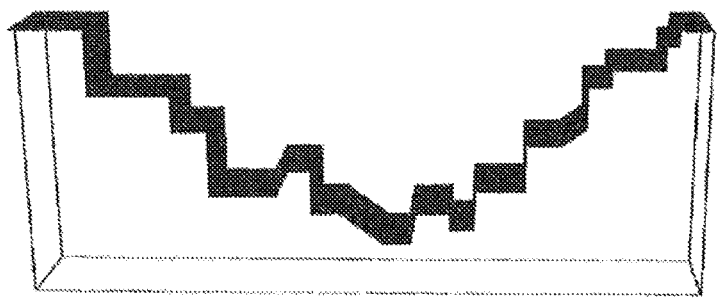
Figure 7:
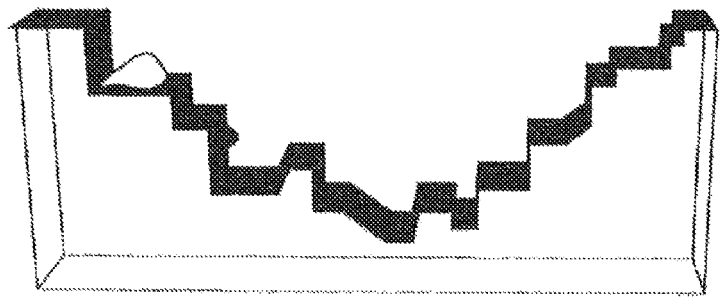
Figure 7:
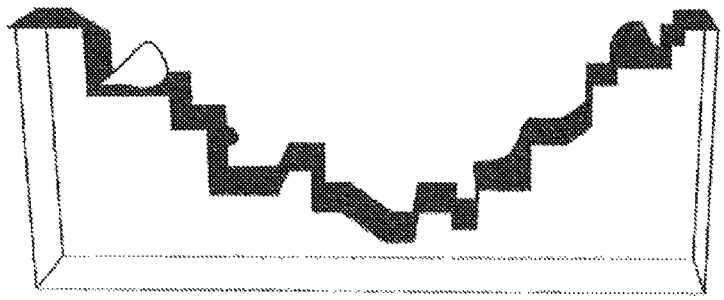

In FIG. 7, a material, which can be dynamically changed, is shown. The material shown is characterized by a stair-like structure, wherein FIG. 7A represents the initial state. In FIG. 7B, the dynamically changing state is shown at a first time point. Here, one can see that additional material has been added on some elements of the stair-like structure. This can happen by own advancement of the material, such as growing (or shrinking), as well as by adding or removing external deposits. In FIG. 7C, this material has further developed, whereby a dynamic security element was created.

Figure 8:
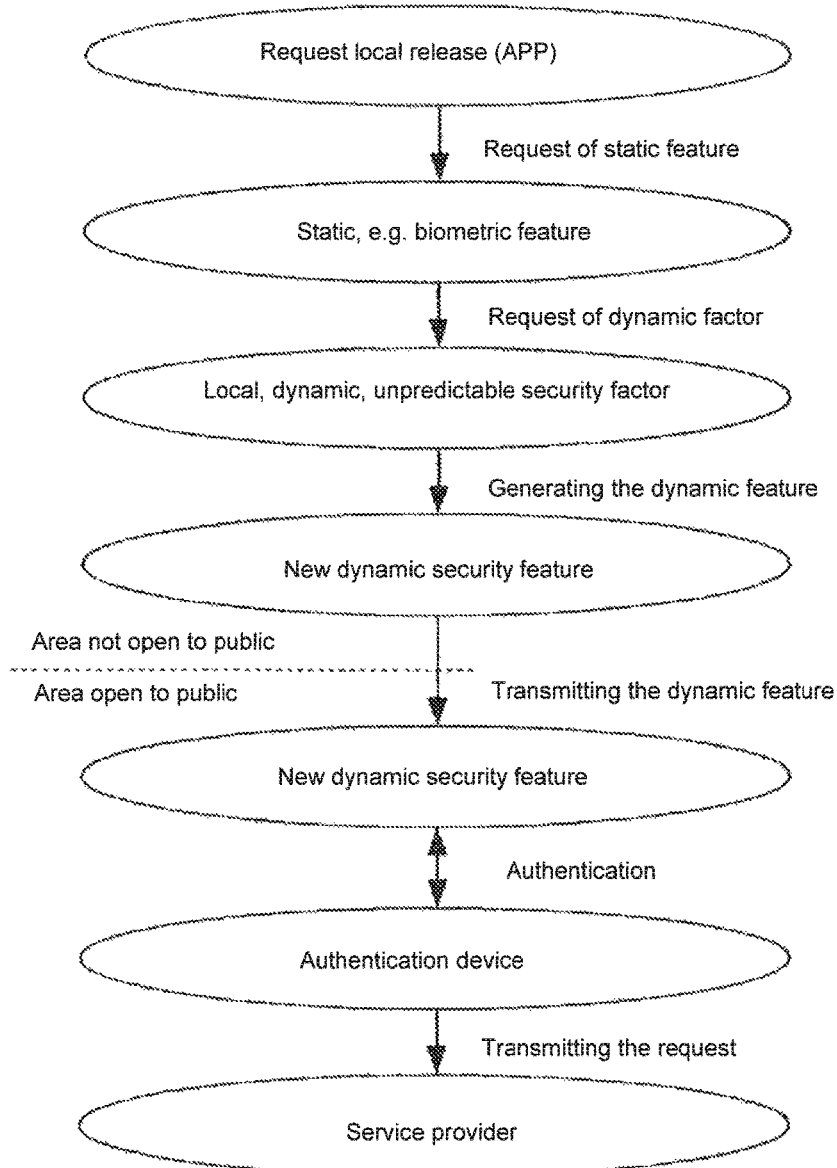

In FIG. 8 a diagram is shown, illustrating how the inventive method can be carried out. First, a static feature is requested, for example, triggered by means of computer software (app). This provides a static, for instance a biometric feature. The static part can also be an identification number or a digit sequence, whereby a faster allocation to a database entry is made possible. The request of the dynamic factor leads to a conversion of the static feature into a new dynamic security feature or is supplemented to such a feature. Thereby, at least one part, for example the added region, is dynamically configured. This dynamic security feature is transmitted to the authentication device, and in case of a positive authentication, the release of a service of a service provider is initiated.

In this variation, a new dynamic security feature is generated from the last dynamic security feature and the local dynamic factor. Again here, a locally triggered request (e.g. by means of software or app) is first carried out, whereby the existing dynamic feature is requested. Subsequently, the request of the current dynamic factor which changes the last dynamic feature is carried out, so that a new dynamic security feature is generated. The dynamic factor can also be identical to the dynamic security element, so that only this must be read again without the help of another locally available dynamic factor. Both elements can also complement each other in order to enhance the security even further. In this variation, the dynamic change thus takes place only with the query, i.e. the security feature does not constantly have to change dynamically. The new dynamic security feature is then finally transmitted to the authentication device and the release to the service provider is initiated upon positive authentication. Even a static security feature can be read dynamically in this variant. In this case, the static security feature is not changed, but only the way how the feature is read, which is achieved by means of a dynamic, locally available further security feature, whereby each new dynamic read-out result emerges.

Figure 9:
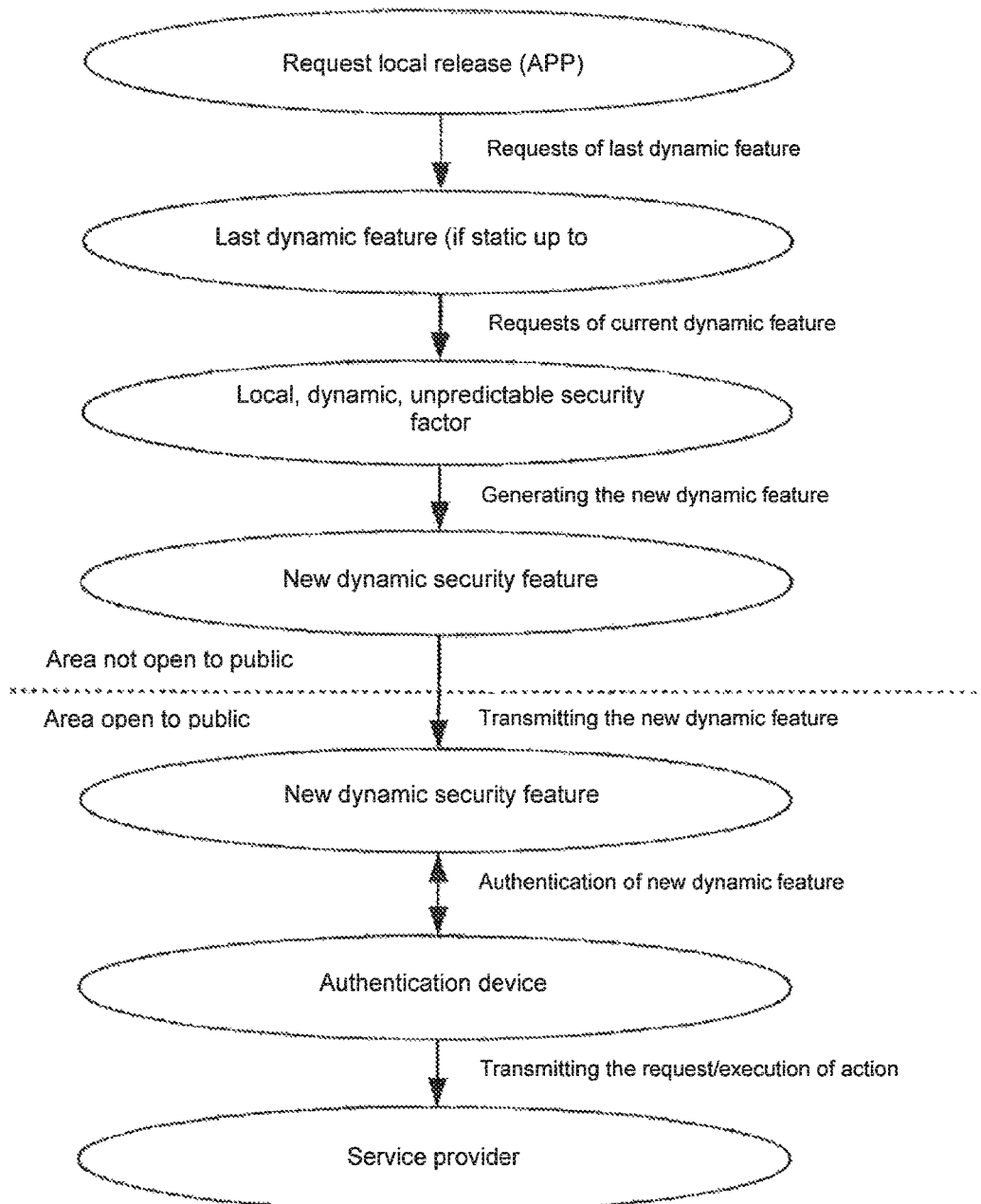

In FIG. 9, a second variant of the method according to the invention is shown. In this variation, a new dynamic material from the recent dynamic material and the local, dynamic factor is generated. Again here, at first a locally triggered request (for example by means of software, app) takes place, in which the existing dynamic feature is requested. Subsequently, the request of the current dynamic factor takes place, which changes the last dynamic feature, so that a new dynamic security feature emerges. In this variation, the dynamic change correlates with the query, i.e. the security feature does not have to constantly change dynamically. The new dynamic security feature is then transmitted to the authentication device and the release to the service provider takes place upon positive authentication. Advantage of this variant is that the security element used in each case is based on each last known state and thus the security element, which was used at the beginning (for example, a biometric feature), is no longer required. It is particularly advantageous in that it potentially should not be made accessible to the third party, so that an authentication can take place.

Figure 10:
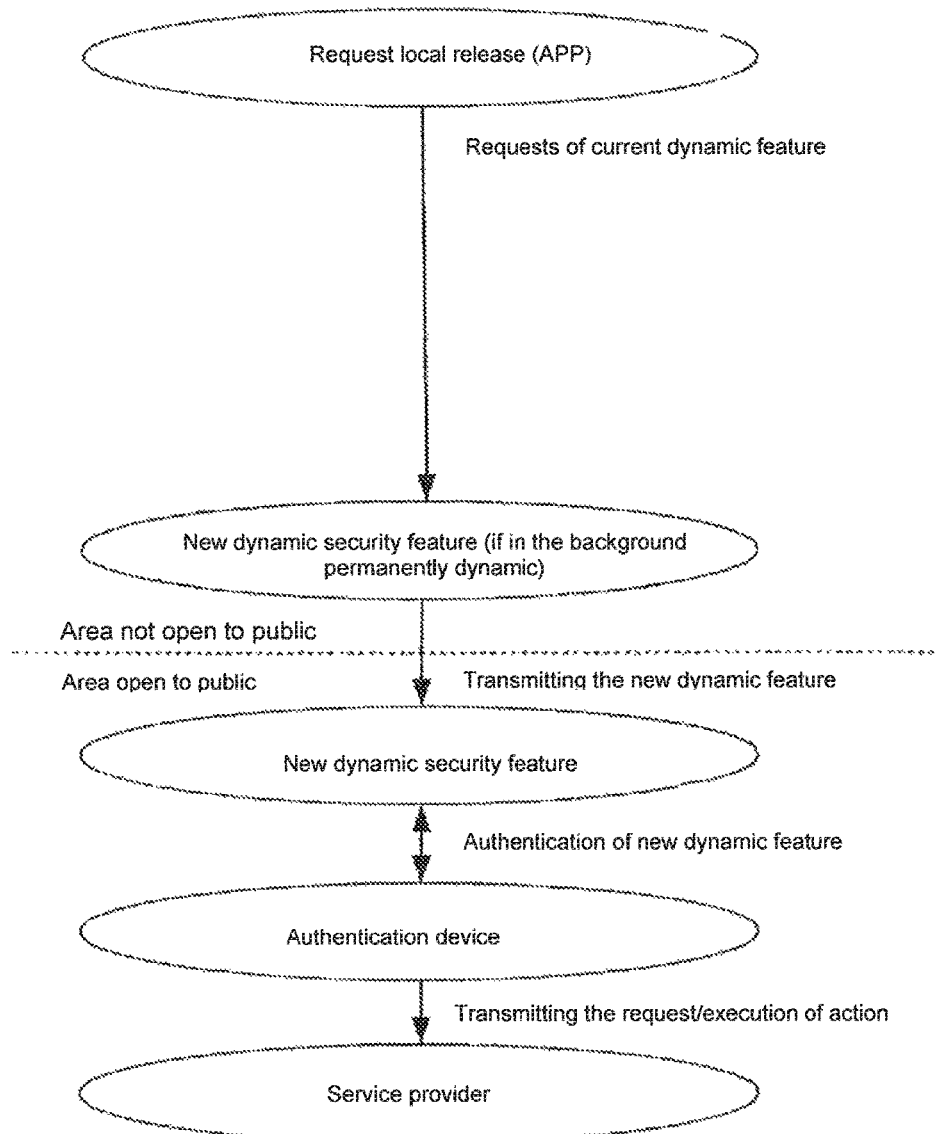

In FIG. 10, a third variant of the method is shown, in which the new dynamic feature is generated from the last dynamic feature and the local dynamic factor. Here, the dynamic change of the security feature takes place continuously in the background, independent of the actual request. After triggering the request, the dynamic feature is invoked and the prevailing state of the feature at this time is used as a new dynamic security feature. Unlike the aforementioned variant, here the dynamic change of the security feature takes place permanently in the background, while in the second variant (FIG. 9) the change in the dynamic security feature takes place only by request. This change is triggered preferably by the dynamic factor.

The invention claimed is:

1. A method for authentication and/or identification of persons, objects or service systems by security features, comprising the steps of:
   a. providing a material, a structure, a substance or a composition for the generating of a security feature,
   b. assigning this material, the structure, the substance or the composition or parts thereof or an image of these to a specific person, an object, a medium or a service system,
   c. capturing the image of this material, the structure, the substance or the composition and storing in a memory device at a first time point,
   d. comparing the image of this material, the structure, the substance or the composition with the image stored in the memory device,
   wherein the material, the structure, the substance or the composition or the image of these is actively changed by a physical, or mechanical impact or feature, so that the resulting structure or property is unpredictable, and that at a later time point the image of the material, the structure, the substance or the composition is captured again and the thus obtained current image is compared with the stored one in the storage device,
   wherein the person and/or object and/or the medium and/or the service system is then authenticated positive by the security feature, if the material, the structure, the substance or the composition vis-à-vis the image stored in the storage device or parts thereof has/have at least partially changed between the two time points,
   wherein the change of the security feature comprises a mechanical impact, a stretching, a drawing, of a material, a mechanical merging of surfaces, the impact of a flexible substrate on the overlying surface or the storage of voids and or particle in a material or substance, and
   wherein the material, the structure, the substance or the composition continuously changes.

2. The method according to claim 1, wherein the material, the structure, the substance or the composition change only dynamically, when it comes to an authentication request.

3. The method according to claim 1, wherein the image of the material, the structure, the substance or the composition is changed after capturing by a dynamic factor regardless of whether the material, the structure, the substance or the composition itself has already changed.

4. The method according to claim 1, wherein before, during or after the authentication request, the image stored in the memory device or parts thereof is/are replaced by the current image.

5. The method according to claim 1, wherein the material, the substance, the composition or the structure comprises cracks or recesses, which increase during stretching or pulling apart.

6. The method according to claim 1, wherein the material, the substance, the composition or the structure comprises at least two surfaces, which develop different from each other.

7. The method according to claim 1, wherein the material, the substance, the composition or the structure consists of a surface, which is coated with a protective coating, such that the structure or feature of this surface is then changed, if the protective coating has been either removed or deactivated.

8. The method according to claim 1, wherein the material, the substance, the composition or the structure contains particles or voids, whose arrangement, position and geometry develop dynamically.

9. Authentication system for performing the method according to claim 1, comprising:
   a local or centralized storage device for storing an image of a security feature in the form of a material, a structure, a substance or a composition, wherein the stored security feature is assigned to a person, an object, a service for service provision or a medium,
   an interrogator to retrieve a current image of the security feature,
   a data comparison means for comparing the retrieved image with the image of the material, the structure, the substance or the composition stored in the memory device,
   wherein the material, the structure, the substance or the composition consist from changing, unforeseeable features or structures, have unpredictable features or structures, which change continuously, and
   wherein the change of the security feature comprises a mechanical impact, a stretching, a drawing of a material, a mechanical merging of surfaces, the impact of a flexible substrate on the overlying surface or the storage of voids and/or particle in a material or a substance.

10. The authentication device according to claim 9, wherein a dynamic factor is provided which effects a dynamic change in the property or the structure of the material, the structure, the substance or the composition wherein the dynamic factor changes itself dynamically between two time points.

11. The authentication device according to claim 9, wherein the material comprises cracks or recesses which increase in case of an extension or a contraction of the material, such that the outer image changes.

12. The authentication device according to claim 9, wherein the rigid geometric elements in the security element are incorporated into the material, such that in case of elongation of the material, individual structures, cracks or recesses in the material become visible.

13. The authentication device according to claim 9, wherein the security feature consists of two different surfaces, wherein one surface exhibits a textured surface with spikes and edges, while the other surface is an untreated surface, such that the two surfaces are mechanically so mergeable that the spikes and edges of the structured surface project, rub, or press in the untreated surface.

14. The authentication device according to claim 9, wherein the security feature has a rigid and a flexible substrate, wherein the rigid substrate does not alter the overlying surface, while the flexible substrate leads to a change in the structure of the overlying surface.

15. The authentication device according to claim 9, wherein the security feature comprises a structured surface, which is covered by a protective coating, which causes that the underlying structure does not change, such that the surface of the dynamic security feature is covered by an activation coating, which changes the underlying structure.

16. The authentication device according to claim 9, wherein the security element comprises particles with individual features that are present in a material or substance, wherein the material includes voids and/or particles, such that the voids and/or particles can be changed in their shape or position.

* * * * *